US008900719B2

(12) United States Patent
Pham et al.

(10) Patent No.: US 8,900,719 B2
(45) Date of Patent: Dec. 2, 2014

(54) BLENDS OF ETHYLENE COPOLYMERS AND PROPYLENE BASED PLASTOMERS IN MULTILAYER FILMS FOR LOW NOISE AND RF WELDING

(75) Inventors: Hoang T. Pham, Painesville, OH (US); Thomas Laney, Spencerport, NY (US); Farid F. Ghiam, Beachwood, OH (US); Kevin O. Henderson, Willoughby Hills, OH (US)

(73) Assignee: Avery Dennison Corporation, Glendale, CA (US)

( * ) Notice: Subject to any disclaimer, the term of this patent is extended or adjusted under 35 U.S.C. 154(b) by 177 days.

(21) Appl. No.: 13/529,401

(22) Filed: Jun. 21, 2012

(65) Prior Publication Data

US 2012/0258326 A1 Oct. 11, 2012

Related U.S. Application Data

(63) Continuation-in-part of application No. PCT/US2011/029925, filed on Mar. 25, 2011, and a continuation-in-part of application No. PCT/US2011/066363, filed on Dec. 21, 2011.

(60) Provisional application No. 61/323,890, filed on Apr. 14, 2010, provisional application No. 61/426,914, filed on Dec. 23, 2010, provisional application No. 61/426,909, filed on Dec. 23, 2010, provisional application No. 61/525,439, filed on Aug. 19, 2011, provisional application No. 61/579,170, filed on Dec. 22, 2011, provisional application No. 61/584,471, filed on Jan. 9, 2012.

(51) Int. Cl.

| | |
|---|---|
| *B32B 27/08* | (2006.01) |
| *B32B 27/30* | (2006.01) |
| *B32B 27/32* | (2006.01) |
| *C08L 31/04* | (2006.01) |
| *B32B 7/00* | (2006.01) |
| *B32B 7/04* | (2006.01) |
| *B32B 7/08* | (2006.01) |
| *B32B 25/08* | (2006.01) |
| *B32B 27/00* | (2006.01) |
| *B32B 27/40* | (2006.01) |
| *C08J 5/00* | (2006.01) |
| *C08L 23/08* | (2006.01) |
| *C08L 33/00* | (2006.01) |
| *C08L 33/08* | (2006.01) |
| *C08L 23/10* | (2006.01) |

(52) U.S. Cl.
CPC . *C08L 31/04* (2013.01); *B32B 7/00* (2013.01); *B32B 7/04* (2013.01); *B32B 7/08* (2013.01); *B32B 25/08* (2013.01); *B32B 27/00* (2013.01); *B32B 27/08* (2013.01); *B32B 27/30* (2013.01); *B32B 27/302* (2013.01); *B32B 27/306* (2013.01); *B32B 27/308* (2013.01); *B32B 27/32* (2013.01); *B32B 27/325* (2013.01); *B32B 27/327* (2013.01); *B32B 27/40* (2013.01); *C08J 5/00* (2013.01); *C08L 23/08* (2013.01); *C08L 23/0869* (2013.01); *C08L 33/00* (2013.01); *C08L 33/08* (2013.01); *C08L 23/10* (2013.01)

USPC ............................ 428/518; 428/522; 428/523

(58) Field of Classification Search
None
See application file for complete search history.

(56) References Cited

U.S. PATENT DOCUMENTS

| | | | |
|---|---|---|---|
| 3,985,826 A | 10/1976 | Futamura | |
| 4,034,079 A | 7/1977 | Schoonman | |
| 5,567,495 A | 10/1996 | Modak et al. | |
| 5,708,083 A | 1/1998 | Kawamura et al. | |
| 5,993,949 A * | 11/1999 | Rosenbaum et al. | ......... 428/213 |
| 6,812,292 B2 | 11/2004 | Matsukawa et al. | |
| 7,147,845 B2 | 12/2006 | Capelli | |
| 7,605,217 B2 | 10/2009 | Datta et al. | |
| 7,629,416 B2 | 12/2009 | Chapman et al. | |
| 8,022,144 B2 | 9/2011 | Chang et al. | |
| 2006/0210739 A1* | 9/2006 | Loffler et al. | ................ 428/35.7 |
| 2007/0040350 A1 | 2/2007 | Bertrand et al. | |
| 2010/0121290 A1 | 5/2010 | Rasmussen | |
| 2010/0272831 A1 | 10/2010 | Lagaron Cabello et al. | |

FOREIGN PATENT DOCUMENTS

| | | |
|---|---|---|
| EP | 0970672 | 1/2000 |
| EP | 1196482 | 4/2002 |
| EP | 1322168 | 7/2003 |
| EP | 1622765 | 2/2006 |
| EP | 1682350 | 7/2006 |
| EP | 1985585 | 10/2008 |
| WO | 03/040442 | 5/2003 |

OTHER PUBLICATIONS

International Search Report dated Apr. 19, 2012 for International Application No. PCT/US2011/066363 filed Dec. 21, 2011.
Written Opinion dated Apr. 19, 2012 for International Application No. PCT/US2011/066363 filed Dec. 21, 2011. "The inhibitory effects of silver nanoparticles, silver ions, and silver chloride colloids on microbia growth"; Water Research 42 (2008) 3066-304; Mar. 4, 2008.

(Continued)

*Primary Examiner* — Sheeba Ahmed
(74) *Attorney, Agent, or Firm* — Avery Dennison Corporation

(57) ABSTRACT

Compositions comprising from about 30% to about 95% of one or more RF-active functionalized ethylene copolymers and one or more propylene based plastomers are described. When formed into films or thin layers, the films exhibit a combination of low noise properties and good RF weldability characteristics. Also described are multilayer assemblies using such films and various articles incorporating such. Also described are methods of determining minimum thicknesses of an RF weldable layer in a multilayer film using the compositions.

23 Claims, 3 Drawing Sheets

(56) References Cited

OTHER PUBLICATIONS

"Antimicrobial nanomaterials for water disinfection and microbial control: Potential applications and implications"; Water Research 42 (2008) 4591-4602.

"Effects of solubilizing surfactants and loading of antiviral, antimicrobial, and antifungal drugs on their release rates from ethylene vinyl acetate copolymer", Padmavathy Tallury etc. Dental materials, pp. 977-982, Issue 8, vol. 23, Jun. 2007).

* cited by examiner

BLENDS OF ETHYLENE COPOLYMERS AND PROPYLENE BASED PLASTOMERS IN MULTILAYER FILMS FOR LOW NOISE AND RF WELDING

CROSS-REFERENCE TO RELATED APPLICATIONS

The present application is a continuation-in-part of International Application No. PCT/US2011/029925 filed Mar. 25, 2011, which claims priority from U.S. Provisional Application Nos. 61/426,914 filed Dec. 23, 2010, and 61/323,890 filed Apr. 14, 2010. The present application is also a continuation-in-part of International Application No. PCT/US2011/66363 filed Dec. 21, 2011, which claims priority from U.S. Provisional Application No. 61/426,909 filed on Dec. 23, 2010. The present application also claims priority from U.S. Provisional Application Nos. 61/525,439 filed Aug. 19, 2011, 61/579,170 filed Dec. 22, 2011, and 61/584,471 filed Jan. 9, 2012. All of the above-mentioned applications are incorporated herein by reference in their entireties.

FIELD

The present subject matter relates to polymeric films and particularly such films which exhibit low noise properties and which are RF weldable. The subject matter also relates to articles comprising such films. And, the present subject matter relates to methods of forming and/or using the films and articles. The films, articles, and methods associated therewith are useful in various fields such as packaging, food storage, and medical and health care applications.

BACKGROUND

In packaging applications, it may be desirable to seal a film package without the use of a separate adhesive film layer on the package. Such a sealing process can be performed by using materials that can be self-adhered, or materials that can be made to adhere to or to adhere to another material. One such process is a process by which radio frequency (RF) energy is applied to a suitable material, and after absorption of the RE energy the material can subsequently be self-adhered, or adhered to different substrates to form a seal. This process is known as RE welding, and suitable materials for such a process are known in commercial practice. Polyvinyl chloride (PVC), for example, is a material that can be susceptible to RF energy and be very suitable for RF welding. PVC, however, is not an acceptable material for widespread use in some areas of the world and alternate materials are needed to perform the function of PVC in those regions where PVC is not desirable.

Selecting suitable alternate materials for use in packaging applications that use the RF welding technique is not a trivial exercise. In selecting or developing suitable alternative materials, at least three (3) criteria need to be met. First, the material must provide good physical and/or mechanical characteristics that are satisfactory for a package or a component thereof. Second, a suitable polymer film should be susceptible to, that is should absorb, RF energy. Third, the polymer film should be capable of forming a bond, weld, or seal, when subjected to RF energy under the proper conditions of pressure and time.

Accordingly, it would be desirable to provide a composition that absorbs RE energy, and can be sealed using RE welding, while yet having physical and mechanical properties suitable for use in packaging applications.

Numerous applications are known in which a gas and vapor barrier film is incorporated in articles to prevent the transmission of gases and vapors to thereby control or prevent the loss of freshness and flavor and/or the escape of aroma or odor. In some applications, including medical and health care applications, it is desirable that the barrier film be relatively quiet and not emit noise upon deflecting or otherwise moving the film. For example, this is a prime objective for materials used in ostomy pouches or similar products worn under a person's clothing.

In an attempt to provide films with high barrier properties with low noise characteristics, artisans have used polyvinylidene chloride or SARAN"-coated films. However, those materials contain chlorine and thus are difficult and/or costly to recycle. Furthermore, films that contain polyvinylidene chloride cannot be incinerated without generating toxic gas. Accordingly, it would be desirable to provide a halogen-free film that exhibited high barrier and low noise properties, to provide a suitable replacement for currently known halogen containing films such as the noted chlorine containing materials.

SUMMARY

The difficulties and drawbacks associated with previously known technology are addressed in the present films, articles and methods involving particular compositions.

In one aspect, the present subject matter relates to a welded film assembly comprising an outer skin layer including at least one RF-active agent and a second layer immediately adjacent to the skin layer. The second layer includes a blend of at least one RF-active functionalized ethylene copolymer and at least one propylene based plastomer.

In another aspect, the present subject matter relates to a film comprising at least one layer that includes from about 30% to about 95% of at least one RF-active functionalized ethylene copolymer and at least one propylene based plastomer.

In another aspect, the present subject matter relates to an article that includes a film comprising at least one layer having from about 30% to about 95% of at least one RF-active functionalized ethylene copolymer and at least one propylene based plastomer.

In still another aspect, the present subject matter relates to a method for determining a minimum thickness of one or more RF weldable layers in a multilayer film. The method comprises identifying a total concentration of polar groups in RF-active components in one or more RF weldable layers in a multilayer film. The method also comprises determining a minimum layer thickness LT(%) of the RF weldable layers by use of equation (I):

$$LT(\%) \geq 465.7 X^{-1.004} \quad (I),$$

wherein X is the total concentration in mole percent of the polar groups in the RF-active components in the RF weldable layers.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
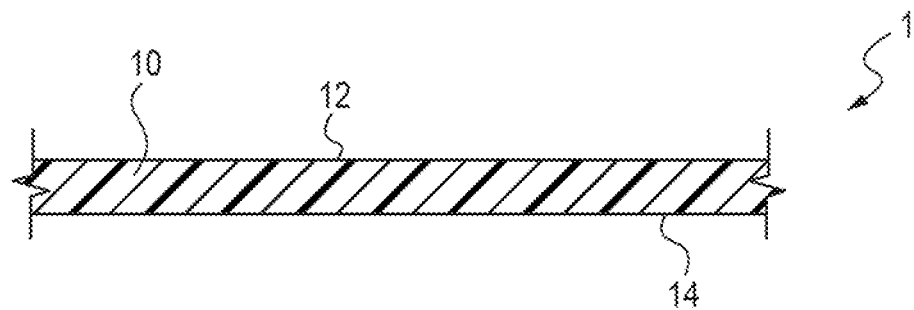
FIG. 1 is a schematic cross sectional view of a single layer film embodiment of the present subject matter.

The present subject matter relates to polymeric compositions adapted for use in forming a layer or film which is well suited for applications in which the films are RF welded. The compositions include a combination of one or more RF-active functionalized ethylene copolymers and at least one propylene based plastomer. The compositions may additionally include other components and agents. Details as to the ethylene copolymers and the propylene based plastomers are as follows.

Ethylene Copolymers

The compositions comprise from about 30% to about 95% of at least one RF-active functionalized ethylene copolymer. As used herein, the term "RF-active" when used in association with a material, refers to a material susceptible to dielectric activation via energy in the RF range which induces rapid heating of the material. "RF welding" refers to bonding of a sealable polymer to a portion of itself or to another RF sealable material using electromagnetic energy or waves in the RF range. i.e., generally a broad frequency range of 0.1-300 MHz, with typical sealing apparatus operating in the frequency range of from 15-28 MHz and particularly generally at about 27.12 MHz. Examples of RF-active functionalized ethylene copolymers include but are not limited to ethylene vinyl acetate (EVA), ethyl methyl acrylate (EMA), ethyl butyl acrylate (EBA), and combinations thereof. It will be appreciated that the present subject matter includes other RF-active functionalized ethylene copolymers, and is not limited to the examples noted herein.

Propylene Based Plastomers

The polymeric compositions also comprise at least one propylene based plastomer or elastomer. The propylene based plastomer or elastomer comprises at least one copolymer with at least about 50 weight percent of units derived from propylene and at least about 5 weight percent of units derived from a comonomer other than propylene. Suitable propylene based elastomers and/or plastomers are described in U.S. Pat. Nos. 7,605,217; 8,022,144; 7,629,416; International application WO 03/040442; and U.S. publication 2007/0040350, each of which is hereby incorporated by reference in its entirety.

Of particular interest for use in the present subject matter are reactor grade propylene based plastomer or elastomers having a molecular weight distribution (MWD) less than 3.5. It is intended that the term "reactor grade" is as defined in U.S. Pat. No. 6,010,588 and in general refers to a polyolefin resin whose molecular weight distribution (MWD) or polydispersity has not been substantially altered after polymerization. The preferred propylene based plastomer or elastomer will have a heat of fusion (as determined using the DSC method described in U.S. publication 2007/0040350) less than about 90 Joules/gm, preferably less than about 70 Joules/gm, and more preferably less than about 50 Joules/gm. When ethylene is used as a comonomer, the propylene based plastomer or elastomer has from 3 to 15 percent of ethylene, or from 5 to 14 percent of ethylene, or 7 to 12 percent ethylene, by weight of the propylene based elastomer or plastomer.

Although the remaining units of the propylene copolymer are derived from at least one comonomer such as ethylene, a $C_{4-20}$ α-olefin, a $C_{4-20}$ diene, a styrenic compound and the like, preferably the comonomer is at least one of ethylene and a $C_{4-12}$ α-olefin such as 1-hexene or 1-octene. Preferably, the remaining units of the copolymer are derived only from ethylene.

The amount of comonomer other than ethylene in the propylene based elastomer or plastomer is a function of, at least in part, the comonomer and the desired heat of fusion of the copolymer. If the comonomer is ethylene, then typically the comonomer-derived units comprise less than about 15 weight percent of the copolymer. The minimum amount of ethylene-derived units is typically at least about 3, preferably at least about 5 and more preferably at least about 9, weight percent based upon the weight of the copolymer. If the polymer comprises at least one other comonomer other than ethylene, then the preferred composition would have a heat of fusion approximately in the range of a propylene-ethylene copolymer with 3 to 20 weight percent ethylene.

The propylene based plastomer or elastomer of the present subject matter can be made by any process, and includes copolymers made by Ziegler-Natta, CGC (Constrained Geometry Catalyst), metallocene, and nonmetallocene, metal-centered, heteroaryl ligand catalysis. These copolymers include random, block and graft copolymers although preferably the copolymers are of a random configuration. Exemplary propylene copolymers include Exxon-Mobil VISTAMAXX polymers, and VERSIFY propylene/ethylene elastomers and plastomers by The Dow Chemical Company.

The density of the propylene based elastomers or plastomers of the present subject matter is typically at least about 0.850, can be at least about 0.860 and can also be at least about 0.865 grams per cubic centimeter ($g/cm^3$) as measured by ASTM D-792. Preferably the density is less than about 0.89 g/cc.

The weight average molecular weight (Mw) of the propylene based elastomers or plastomers of the present subject matter can vary widely, but typically it is between 10,000 and 1,000,000 (with the understanding that the only limit on the minimum or the maximum $M_w$ is that set by practical considerations). For homopolymers and copolymers used in barrier films, preferably the minimum Mw is about 20,000, and more preferably about 25,000.

The polydispersity of the propylene based elastomers or plastomers of the present subject matter is typically between 2 and 5. "Narrow polydispersity", "narrow molecular weight distribution", "narrow MWD" and similar terms mean a ratio ($M_w/M_n$) of weight average molecular weight ($M_w$) to number average molecular weight ($M_n$) of less than about 3.5, can be less than about 3.0, can also be less than about 2.8, can also be less than about 2.5.

The propylene based plastomer or elastomer for use in the present subject matter ideally has a melt flow rate (MFR) of from 0.5 to 2000 g/10 min, preferably from 1 to 1000, more preferably from 2 to 500, and still more preferably from 2 to 40. The particular MFR selected will depend in part on the intended production methods such as blown film, extrusion coating, sheet extrusion, injection molding or cast film processes. MFR for copolymers of propylene and ethylene and/or one or more $C_4$-$C_{20}$α-olefins is measured according to ASTM D-1238, condition L (2.16 kg, 230 degrees C.).

In certain applications it may be beneficial to utilize a particular propylene based plastomer commercially available from Dow Chemical under the designation VERSIFY 2300. The VERSIFY 2300 is a propylene based plastomer and is believed to be an ethylene-propylene elastomer. Table 1 set forth below lists various physical properties and characteristics of the VERSIFY 2300 material.

TABLE 1

Properties of VERSIFY 2300

|  | Nominal (English) Value | Nominal (SI) Value | Test Method |
|---|---|---|---|
| Physical | | | |
| Density | 0.867 g/cm³ | 0.867 g/cm³ | ASTM D792 |
| Melt Mass-Flow Rate 230° C./2.16 kg) | 2.0 g/10 min | 2.0 g/10 min | ASTM D1238 |
| Total Crystallinity | 13% | 13% | Dow Method |
| Mechanical | | | |
| Tensile Strength (Break, Compression Molded) | 2740 psi | 18.9 MPa | ASTMD638 |
| Tensile Elongation Break, Compression Molded | 730% | 730% | ASTMD638[1] |
| Flexural Modulus - 1% Secant (Compression Molded) | 6120 psi | 42.2 MPa | ASTM D790 |
| Hardness | | | |
| Durometer Hardness | | | ASTM D2240[2] |
| Shore A, Compression Molded | 88 | 88 | |
| Shore D, Compression Molded | 32 | 32 | |
| Thermal | | | |
| Glass Transition Temperature (DSC) | −16.6° F. | −27.0° C. | Dow Method |
| Vicat Softening Temperature | 109° F. | 43.0° C. | ASTM D1525 |
| Melting Temperature (DSC) | 151° F. | 66.0° C. | Dow Method |
| Optical | | | |
| | | | ASTM D523 |
| Gardner Gloss | | | |
| 20°, 39.4 mil (1000 μm) Compression Molded | 70 | 70 | |
| 60°, 39.4 mil (1000 μm), Compression Molded | 109 | 109 | |
| Haze (78.7 mil (2000 μm), Injection Molded) | 6.0% | 6.0% | ASTM D1003 |

Notes
[1] 2.0 in/min (50 mm/min)
[2] Hardness after 10 seconds

The compositions described herein which include the particular combination of RF-active functionalized ethylene copolymer and propylene based plastomer can be used to form relatively thin films. Such films find wide application such as in packaging films and in medical and hygiene applications. The thickness of the film depends upon various factors such as its intended use and extent of RF weldability function desired, however typical thicknesses range from about 10 to about 350 microns, and in certain embodiments from about 25 to about 200 microns.

FIG. 1 is a schematic illustration of a preferred embodiment film 1 in accordance with the present subject matter. Specifically, the film 1 includes a layer 10 comprising a composition as described herein. The layer 10 defines a first face 12 and an oppositely directed second face 14. Generally, the layer 10 comprises from about 40% to about 95% of at least one RF-active functionalized ethylene copolymer and at least one propylene based plastomer. In many applications, the functionalized ethylene copolymer is one or more of ethylene vinyl acetate (EVA), ethyl methyl acrylate (EMA), ethyl butyl acrylate (EBA), and/or combinations thereof. Depending upon the application, the propylene based plastomer is a VERSIFY material such as VERSIFY 2300 from Dow Chemical. The resulting film 1 exhibits a beneficial combination of properties including low noise and good RF weldability.

Layer(s)

The multilayer films of the present subject matter may also include one or more barrier layers. The barrier layers can include norbornene-based materials such as cyclic olefin copolymers (COC's) and polymers of ethylene vinyl alcohol (EVOH).

In a preferred embodiment of the present subject matter, a polymeric barrier film is provided which comprises at least one layer comprising a cyclic olefin copolymer (COC). Cyclic olefin copolymers are also known as cyclo ethylene copolymer, COC, cyclo olefin copolymer, cyclic olefin polymer, and ethylene-norbornene copolymer. The terms "cyclic olefin copolymer" or "COC" are used interchangeably herein and include these various terms of art. It is contemplated that in certain embodiments, various norbornene-based materials may be used instead of or in addition to the COC's, as described in greater detail herein. And, in particular embodiments, an elastomeric COC is used. In certain embodiments, the COC is a semi-crystalline COC. And, in other embodiments, the COC is an amorphous COC. In other embodiments, it is preferred to utilize blends of one or more of these COCs and optionally with other materials such as polyolefins, tie components, and/or amorphous COCs as described in greater detail herein.

Presently, there exist numerous grades of commercially available cyclic olefin copolymers based on different types of cyclic monomers and polymerization methods. Cyclic olefin copolymers are typically produced by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethene. Non-limiting examples of commercially available cyclic olefin copolymers include those available from TOPAS Advanced Polymers under the designation TOPAS, Mitsui Chemical's APEL, or those formed by ring-opening metathesis polymerization of various cyclic monomers followed by hydrogenation, which are available from Japan Synthetic Rubber under the designation ARTON, and Zeon Chemical's ZEONEX and ZEONOR.

In accordance with the present subject matter, a barrier layer comprising a semi-crystalline COC is provided. In other preferred embodiments, a combination of COCs is used in one or more barrier layers. Most preferably, the combination of COCs includes a semi-crystalline COC and one or more amorphous COCs. However, the subject matter includes a combination of two or more semi-crystalline COCs and optionally further combined with one or more amorphous COCs.

Preferably, the semi-crystalline COC has a melting temperature (Tm) of from about 70° C. to about 100° C., more preferably from about 80° C. to about 90° C., and most preferably from about 82° C. to about 86° C. Preferably, the semi-crystalline COC has a glass transition temperature (Tg) of from about −20° C. to about 32° C., more preferably from about −8° C. to about 20° C., and most preferably from about 0° C. to about 12° C. In certain embodiments, it may be preferred to use a semi-crystalline COC having a glass transition temperature of from about 3° C. to about 9° C. Preferably, the semi-crystalline COC has a norbornene content of from about 5% to about 25%, more preferably from about 10% to about 20%, and most preferably from about 12% to about 18%. In certain embodiments it is preferred to utilize a semi-crystalline COC having a norbornene content of less than 20%. In certain embodiments, it is preferred to utilize a semi-crystalline COC having a particular degree of crystallinity. For example, in certain applications it is preferred to use a semi-crystalline COC having a crystallinity of 5% or more by weight. In other applications, it is preferred to utilize a semi-crystalline COC having a crystallinity of 10% or more by weight. And in still other embodiments, it is preferred to use a semi-crystalline COC having a crystallinity of 20% or more by weight.

A most preferred semi-crystalline COC is commercially available under the designation E-140 from TOPAS. The melting temperature of the E-140 grade is about 84° C. and has a Vicat softening temperature of about 64° C. The glass transition temperature of the E-140 grade is about 6° C. The norbornene comonomer content of the E-140 grade is believed to be about 12% to about 18%.

As noted, in certain embodiments, it may be preferred to combine one or more semi-crystalline COCs with one or more amorphous COCs. The preferred amorphous COCs have a Tg of from about 33° C. to about 180° C., more preferably from about 45° C. to about 130° C., and most preferably from about 60° C. to about 80° C. Preferred amorphous COCs which are commercially available include grades 9506 and 8007, and particularly grade 8007F-04 from TOPAS.

If one or more amorphous COCs are used in combination with the semi-crystalline COC, it preferred that the weight proportion of the semi-crystalline COC range from about 1% to about 99%, more preferably from about 5% to about 75%, and most preferably from about 10% to about 50%, based upon the total weight amount of COC's in the barrier layer. However, it will be appreciated that the invention includes barrier layers with less than 1% semi-crystalline COC, and greater than 99% semi-crystalline COC.

For certain applications, it may be preferred to utilize a COC having elastomeric properties. As will be appreciated, elastomers exhibit a property of viscoelasticity or as commonly referred, elasticity. Elastomers typically have a relatively low Young's modulus and a high yield strain as compared to most other materials. It is contemplated that an elastomeric COC could be used in the various embodiments described herein. Reported information for an elastomeric COC from TOPAS indicates that the COC elastomers have a tensile modulus of about 4,412 N/cm$^2$ and elongation at break greater than 450%. In addition, the elastomeric COC exhibits relatively low dielectric properties comparable to certain fluoroelastomers, thereby providing excellent electrical insulation performance. Furthermore, the material is reported to maintain ductility at temperatures below 80° C. The noted elastomeric COC also reportedly exhibits a Shore A hardness of 89.

In certain other embodiments, it is preferred to utilize ethylene vinyl alcohol (EVOH) in the polymeric barrier film. Specifically, the EVOH may be incorporated in the layer(s) comprising COC, and/or be provided in one or more separate layers proximate the COC-containing layer(s) in the barrier film. Ethylene vinyl alcohol, commonly abbreviated EVOH, is a formal copolymer of ethylene and vinyl alcohol. Because the latter monomer mainly exists as its tautomer acetaldehyde, the copolymer is prepared by polymerization of ethylene and vinyl acetate to produce the ethylene vinyl acetate (EVA) copolymer followed by hydrolysis. EVOH is typically used to provide barrier properties, primarily as an oxygen barrier for improved food packaging shelf life and as a hydrocarbon barrier for fuel tanks. EVOH is typically coextruded or laminated as a thin layer between cardboard, foil, or other plastics. EVOH copolymer is traditionally defined by the mole percent ethylene content. Lower ethylene content grades have higher barrier properties, and higher ethylene content grades have lower temperatures for extrusion. Additional information as to preferred aspects of EVOH used in the films of the subject matter are described in greater detail herein.

The present subject matter also provides multilayer films for use in medical applications and in particular, for ostomy applications. As will be appreciated, an important characteristic for such films is preventing or at least significantly reducing transmission of odors through the film, and particularly reducing transmission of skatole or 3-methylindole through the film. Another important characteristic for such films is that the films be relatively quiet and not emit excessive noise upon deflecting or movement of the film. A preferred multilayer barrier construction uses one or more barrier layers that include a semi-crystalline cyclic olefin copolymer (COC) and in combination with one or more flexible support layers. Another preferred multilayer barrier construction includes one or more barrier layers that include ethylene vinyl alcohol in conjunction with one or more layers which include a semi-crystalline COC. In other embodiments, the preferred multilayer barrier construction includes one or more of the previously noted aspects in further combination with an inner layer containing one or more antimicrobial agents.

Figure 2:
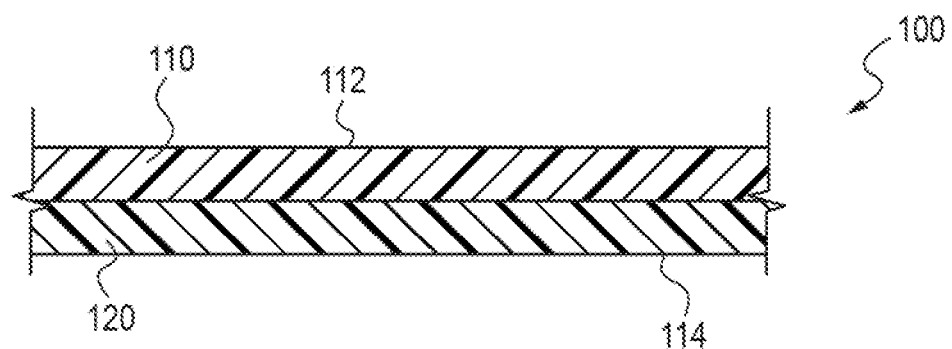
FIG. 2 is a schematic cross sectional view of a multilayer film embodiment of the present subject matter.

FIG. 2 illustrates a multilayer film 100 of the present subject matter. The film 100 comprises a low noise and RF weldable layer 110 and one or more barrier layer(s) collectively shown and designated as layer 120. The film 100 defines a first face 110 and an oppositely directed second face 114. The low noise and RF weldable layer 112 can be the same or similar to previously described layer 10 of FIG. 1. The barrier layer(s) 120 typically include one or more COC's and/or EVOH. However, it will be appreciated that in no way is the present subject matter limited to such. Instead, the present subject matter includes other materials, agents, and combinations of such in the barrier layer(s) 120.

Figure 3:
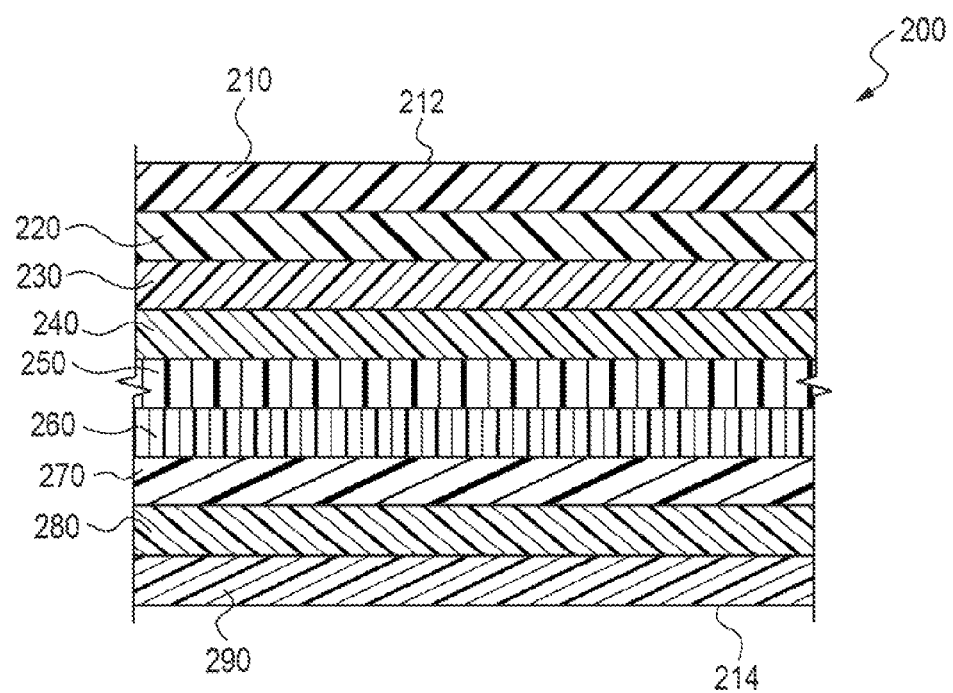
FIG. 3 is a schematic cross sectional view of another multilayer film embodiment of the present subject matter.

FIG. 3 illustrates another multilayer film 200 in accordance with the present subject matter. The film 200 comprises a low noise and RF weldable layer 210 and one or more additional layers such as one or more barrier layers, tie layers, inner layers, and/or flexible support layers. Layer 210 also optionally contains a masterbatch of slip and anti block (AB) agents. The masterbatch is preferably SAB1016 BA masterbatch available from A. Schulman, added at about 20% by weight. It will be appreciated, however, that a wide array of other slip agents and/or antiblock agents could be used. Non-limiting examples of other slip agents include primary and secondary amide slip agents, polydimethyl siloxane and its copolymers, polywax slip agents, and other like agents. Non-limiting examples of other antiblock agents include inorganic fillers such as talc, calcium carbonate, clay and the like; and polymeric agents such as low density polyethylene (LDPE), highly branched low density polyethylene, low content ethylene vinyl acetate (EVA) or ethylene butyl acrylate (EBA) and other comparable components. In certain embodiments, effective amounts of ethylene butyl acrylate (EBA) can be included in layer 210. Optionally, an effective amount of a tie component can be used in this layer. If a tie component is used in layer 210, the material is preferably anhydride (M.A.) modified. An example of such a material is BYNEL E418, available from DuPont. That material is described as anhydride-modified EVA, and is believed to be maleic anhydride grafted EVA polymer. Another example is PLEXAR from Equistar which may include grated M.A. HDPE, LLDPE, PS, or PP.

Layers 220, 230, 270 and 280 are each a flexible support layer. The preferred embodiment multilayer film preferably includes multiple flexible support layers. The support layers provide bulk, strength, softness, and cohesiveness to the resulting multilayer assembly. In certain multilayer configurations, the one or more flexible support layers serve to dampen noise that might otherwise be emitted upon deformation or movement of the film. These layers preferably comprise one or more polyolefins, plastomers, styrene elastomers, and/or combinations thereof. Preferably, the flexible support layers such as layers 220, 230, 270, and 280 comprise one or more polymers having a relatively low density of from about 0.75 to about 1.10 $g/cm^3$, more preferably from about 0.85 to about 1.01 $g/cm^3$, and more preferably from about 0.865 to about 0.91 $g/cm^3$. Preferably, the polyolefins in the support layers such as layers 220, 230, 270 and 280 have a melt flow index (MI) of from about 0.1 to about 1000 g/10 min, and more preferably from about 0.5 to about 10 g/10 min. Preferably, the polyolefins used in the support layer(s) such as layers 220, 230, 270, and 280, include an ethylene based polymer with one or more alkyl comonomer(s) selected from the family of propylene, butylene, hexene, octene, and the like. The polyolefin can be a random copolymer or a block copolymer. In certain embodiments, it may be preferred to utilize one or more plastomer(s) in the support layer(s) such as layers 220, 230, 270, and 280. A plastomer is a polyolefin elastomer. A preferred plastomer is a propylene based plastomer having an alkyl comonomer in the family of ethylene, butylene, hexene, octene and the like. The noted plastomer can be a random copolymer or a block copolymer.

As noted, the flexible supports in the preferred multilayer constructions utilize a low density polyolefin and preferably, a polyolefin elastomer. A wide array of commercially available polyolefin elastomers can be used for one or more of the flexible support layers. Representative preferred examples of such materials include KRATON™ D1164P and G2832 available from Kraton Polymers US, LLC of Houston, Tex.; DOW AFFINITY™ DG8200 and EG8100; DOW VERSIFY™ 3200 and 3000; and DOW INFUSE™ such as INFUSE 9000 from Dow Chemical Corp. of Midland, Mich.; DYNAFLEX™ G2755 from GLS Corp. of McHenry, Ill.; SEPTON™ 2063 from Kuraray of Tokyo, Japan; and VISTAMAXX™ VM1100 from ExxonMobil Chemical Co. of Houston, Tex. Another preferred commercially available material for any of layers 220, 230, 270 and/or 280 is an elastomer material available from Mitsui Chemicals under the designation NOTIO™. A preferred grade is NOTIO™ PN 2070.

In certain versions of the present subject matter, it is preferred to utilize one or more styrenic elastomers in one or more of the support layers, such as layers 220, 230, 270, and 280. The one or more styrenic elastomers can be used exclusively or in combination with one or more polyolefins and/or polyolefin elastomers. An example of a commercially available styrenic elastomer is the previously noted SEPTON™ material. In certain embodiments, it may be preferred to incorporate acrylonitrile butadiene styrene (ABS) in one or more of the support layers.

One or more of layers 220, 230, 270 and 280 may also comprise ethylene butyl acrylate (EBA). A variety of different grades of EBA can be used, however, a commercially available grade under the designation LOTRYL 30 BA 02 from Arkema has been identified as providing desired characteristics. It is also contemplated that effective amounts of ethylene vinyl acetate (EVA) for example having a vinyl acetate content of about 18% or higher, can also be included in one or more of the layers 220, 230, 270, and 280. Although EBA or other acrylate, or EVA can be incorporated in any of the layers 220, 230, 270 and/or 280, it is preferred to incorporate EBA in layer 280. If EBA or EVA is incorporated in one or more layers such as layer 280, it is preferred to incorporate the EVA or EBA at a weight ratio of about 99% to about 50% with from about 1% to about 50% of polyolefin elastomer(s), i.e. plastomer(s). Most preferably, if EBA or EVA is used in layer 280, it is preferred to utilize about 60% of that material based upon the total weight of components in that layer.

In addition, one or more of layers 220, 230, 270, and 280 may also comprise a tie component. The tie component may be as previously described, and is preferably BYNEL CXA 410E710 from DuPont. Although the subject matter is not limited to any particular concentration of the tie component in any of the noted layers, a proportion of up to about 20% based upon the total weight of the respective layer is useful.

A barrier layer 250 is primarily for reducing transmission of oxygen and/or water, preferably comprises EVOH. The EVOH is incorporated at nearly any effective concentration, however typical concentrations range from about 40% to about 100%, preferably from about 50% to about 80%, and most preferably from about 60% to about 70%. In certain versions, layer 250 includes 100% of EVOH. Layer 250 preferably comprises ethylene vinyl alcohol (EVOH)SP292, E171, and/or G176 available from Eval Americas. The EVOH used in layer 250 preferably has an ethylene content of from about 25% to about 50%, more preferably from about 32% to about 48%, and most preferably from about 35% to about 48%. In certain versions, the EVOH used in layer 250 has an ethylene content of 44%. As will be understood, these values are molar percents, i.e., the molar proportion of ethylene in the ethylene vinyl alcohol material used.

It is also contemplated that the barrier layer 250 may comprise one or more cyclic olefin copolymers instead of or in addition to EVOH. In certain embodiments, it may be preferred to provide an odor blocking layer that comprises one or more cyclic olefin copolymers. Although not wishing to be bound to any particular theory, it is believed that upon incorporation of a cyclic olefin copolymer, the shape of the norbornene rings in the polymeric matrix tend to trap or block odor producing molecules and/or chemical species. The use of one or more cyclic olefin copolymers in a barrier layer may be particularly desirable if water vapor transmission rate (WVTR) is not a concern for that layer.

Each of layers 240 and 260 comprises one or more semicrystalline cyclic olefin copolymer (COC). These layers primarily function as odor barrier layers and are as previously described herein. As noted, the preferred COC is from TOPAS under the designation E-140 and has a density of 0.94 g/cc and a comonomer content of about 12% to about 18% norbornene. As previously noted, the E-140 COC is a semi-crystalline material and has a melting temperature of about 84° C., a Vicat softening point of about 64° C., and a glass transition temperature of about 6° C. It is also contemplated that two grades of amorphous COC from TOPAS, grade 9506F and/or grade 8007, may be blended with the E-140 grade. A non-limiting representative blend ratio of semi-crystalline COC to amorphous COC is about 50/50 by weight. The Tg of grade 8007 is 78° C. The Tg of grade 9506F is 65° C. The one or more COCs can be used in the moisture or odor barrier layer in nearly any concentration, such as from about 10% to about 100%, more preferably from about 50% to about 99%, more preferably from about 65% to about 95%, more preferably from about 70% to about 90%, and most preferably about 80%. The COCs used in layers 240 and 260 may be same as one another. Alternatively, the COCs used in these layers may be different from one another.

One or both of layers 240 and 260 preferably also comprise a tie component. Preferably, the tie component is a polymeric resin. The tie component can be used at any effective concentration, such as from about 1% to about 40% by weight, preferably from about 10% to about 30% by weight, and most preferably about 20% by weight, based upon the total weight of the respective layer, such as layer 40 or layer 60. In layers 240 and 260, the tie component is preferably BYNEL CXA410E710. It is believed that this is an anhydride modified olefin.

Layer 290 is an inner layer and depending upon the end use application, preferably includes one or more antimicrobial agents. In certain versions, layer 290 comprises 70% EBA 30, 20% of a slip and antiblock masterbatch, and an effective amount of a silver ion anti-microbial masterbatch. In certain versions, the amount of the antimicrobial masterbatch is from about 8% to about 15%, and more preferably from about 10% to about 12%. As previously described with respect to layer 280; in layer 290, one or both of ethylene vinyl acetate (EVA) and/or ethylene butyl acrylate (EBA) can be used. If EVA is used, EVA having a vinyl acetate content of about 18% or higher is preferably utilized. In certain embodiments, layer 290 preferably comprises 70% EBA having a butyl acrylate content of about 30%. In layer 290, 20% by weight of the SAB1016 BA masterbatch is preferably used. The SAB1016 BA masterbatch comprises slip agent(s) and antiblock agent(s) as previously described herein. In layer 290, the anti-microbial masterbatch is ABACT 422VA from A. Schulmann. However, it is also contemplated that such anti-microbial masterbatch may be substituted with BACTIBLOCK from Nanobiomatters. The Nanobiomatters antimicrobial is a silver ion on a modified organoclay. If the BACTIBLOCK masterbatch is used, in certain embodiments it is preferred to incorporate the masterbatch in the layer at a concentration of about 12%. In certain embodiments, the antimicrobial layer also preferably comprises one or more sealable polymers such as metallocene-catalyzed linear low density polyethylene (LLDPE).

The preferred embodiment multilayer barrier film described and schematically depicted in FIG. 3, preferably utilizes each of layers 210, 220, 230, 240, 250, 260, 270, 280, and 290 at certain thicknesses. That is, by appropriate selection of thickness for each layer, the overall thickness of the resulting multilayer barrier is still relatively thin, yet the film exhibits excellent barrier properties. In certain embodiments, a preferred ratio of thickness for layers 210, 220, 230, 240, 250, 260, 270, 280, and 290 is 10/14/14/8/7/8/9/20/10, respectively. Other slight variations in thickness are contemplated. The total thickness of the three middle layers, i.e. layers 240, 250, and 260, is preferably about 30% or less of the total thickness of the multilayer film. Preferred film thickness for an ostomy application is about 70 to about 100 microns, but could be thinner or thicker.

In certain embodiments, the total layer thickness of layers 280 and 290 will be from about 25% to about 30% of the total thickness of the multilayer film. In certain embodiments, the layer containing EVOH, e.g. layer 250, has a thickness of from about 3% to about 10%, more preferably from about 5% to about 9%, and most preferably from about 6% to about 8% of the total thickness of the multilayer film. In certain embodiments, the total or combined thickness of layer(s) containing COC, e.g. layers 240 and 260, is from about 10% to about 40%, more preferably from about 12% to about 36%, and most preferably from about 14% to about 30% of the total thickness of the multilayer film.

Preferably, layers 280 and 290 impart heat sealability characteristics to the resulting multilayer barrier film. Preferably, at least the materials selected for these layers render the resulting multilayer barrier film weldable and most preferably thermally weldable. Accordingly, at least a portion of the materials used in layers 280 and/or 290 are polar. This enables RF welding of the multilayer assembly. One or more polar materials such as EVA or EBA are provided in the outer layer to facilitate RF welding. However, if heat sealing or other thermal means, polar compounds may not be necessary. Instead, agents such as octene-based PE's, ULDPE (non-polar), and the like can be used.

It is also contemplated that one or more ionomers and preferably zinc ionomers can be incorporated in any of the layers of the multilayer barrier film. For certain embodiments, one or more ionomers can be incorporated in any of the support layers 220, 230, 270 and/or 280. Preferably and in certain embodiments, one or more ionomers are included in layer 280. It is also contemplated that one or more ionomers could be included in the secondary barrier layer 250 containing EVOH. The one or more ionomers can be used at any effective concentration. However, typically such concentrations range from about 5% to about 40%, preferably from about 10% to about 30%, and most preferably from about 15% to about 20%.

The present subject matter includes a wide array of multilayer barrier assemblies and in no way is limited to the embodiment depicted in FIG. 3. For example, in another preferred embodiment, a multilayer barrier film is provided in which one or more support layer(s) are disposed between a COC-containing layer and a layer containing EVOH. Representative sequences of layers in accordance with preferred embodiments of the present subject matter may include:

(i) COC/Support/EVOH/Support/COC,
(ii) COC/Support/EVOH/Support,
(iii) Support/EVOH/Support/COC,
(iv) COC/EVOH/Support/COC,
(v) COC/Support/EVOH/COC, (vi) COC/Support/EVOH,
(vii) Support/EVOH/COC,
(viii) COC/EVOH/Support, and
(ix) Support/COC/EVOH.

Again, it is to be understood that in no way is the subject matter limited to any of the particular layer sequences noted herein. Moreover, it will also be appreciated that the subject matter includes one or more additional layers included or otherwise incorporated in the representative examples (i)-(ix) such as for instance, outer face layers and/or inner layers which may optionally include antimicrobial agents.

As stated previously, in addition to barrier properties, it is often desirable that a polymeric barrier film not emit noise when deflected, crumpled or otherwise moved. For example, in ostomy or incontinence applications, it is desirable that the ostomy or incontinence bag not emit noise. As will be appreciated, such articles are typically worn under a user's clothing so as to hide the article from view. Films or polymeric layers that are not quiet tend to emit undesirable noise when the user undergoes motion such as when walking or sitting. In the case of the preferred embodiment multilayer barrier films, the films are significantly quieter than comparable ostomy films.

Articles

A wide array of articles can be formed in accordance with the present subject matter. In many of the embodiments, the articles utilize single or multilayer films or film assemblies as described herein. In certain article versions, the film(s) is interconnected or configured to form a cavity within the article. An example of such an article is a pouch such as used in ostomy applications. In certain applications, the cavity will be used for the containment of a fluid, for example, such as a medical fluid or a bodily fluid in the case of the ostomy pouch. The term "pouch" as used herein also includes bags, satchels, and the like.

In one embodiment, the present subject matter provides either a monolayer or a multilayer film and certain articles of manufacture produced from the monolayer and/or the multilayer films of the subject matter. In certain embodiments, a multilayer film has a first exterior layer comprising a polymer blend, a second exterior that may be the same of different from the first exterior layer, and at least one inner layer disposed between the exterior layers.

In an embodiment of the subject matter, an ostomy pouch may be configured to be worn by a patient. In certain embodiments of the subject matter, the ostomy pouch may be configured to be attached to a patient's bedside or even a stand using for example a handle affixed to the pouch. The optional handle may be attached to a stand or, for example, a loop or similar device attached to a belt or harness to be worn by a patient. In other embodiments of the subject matter, depending, for example upon the intended use of the pouch, the pouch need not be worn by a patient and need not necessarily be configured to attach to a patient's bedside or even a stand.

Generally, the pouches include a front panel and a back panel which are fixedly joined to an inner film and are adheredly joined to each other along their adjacent peripheral edges to form a seam at opposing side edges. However, in certain embodiments, the surface area about which the back panel is disposed may be such that any portion of the back area of the ostomy pouch will be a point of contact with the back panel. In one embodiment, the material of the back panel is defined such that it is adherent with a nonwoven fabric, for example, a non-woven polyester fabric. The nonwoven layer attached to the back panel is intended to provide comfort to and is compatible with the skin of the patient.

In certain embodiments, the front panel and the back panel are unconnected along a top end to allow for filling of the multifilm pouch. In other embodiments, the front panel and the back panel include inner surfaces that are heat sealed to each other along the bottom end of the multifilm pouch.

In certain embodiments, the inner film is a single sheet having two longitudinal side edges, wherein the sheet material is folded to form opposing side edges of an inner portion of the multifilm pouch, and the opposing side edges are sealed to each other to form a vertical seam that extends longitudinally along a length of the inner portion to define the cavity.

In certain embodiments, the front panel and the inner film may be clear to allow viewing of the fluid contained within the pouch. For example, in certain applications, the fluid may be of a particular color or have sediment, which may be informative to the person viewing the contents. Additionally, the amount of fluid contained within the pouch may also be readily viewable if the front panel and the inner film are clear. In certain embodiments, the film of the front panel may be defined such that it is amenable to being surface printed.

In certain embodiments, the back panel may be clear or a pigment may be included in the back panel, or rather a pigment may be included in any layer of the film used for the back panel. For example, a white pigment or a pigment imparting another color may add the background needed in order to provide a better perspective when viewing the fluid through the front panel and inner film. Additionally, a pigmented back panel will allow, in certain embodiments, the user to be informed of which side of the pouch is the backside and which side of the pouch is intended to be the front side. In particular, this may be important in those embodiments when a nonwoven has not additionally be affixed the back panel.

According to an embodiment of the invention, the materials used in the construction of the pouch meet FDA requirements.

As can be appreciated by those having ordinary skill in this art, the pouches of the present subject matter are not limited to a one-film structure or a three-film structure as described herein. Pouches having any number of films, e.g., two, four, five, or more layers, are included within the scope of the present subject matter. For example, additional film(s) may be included in the pouch in order to enhance the strength, increase the moisture barrier capabilities of the pouch, reduce oxygen permeability, etc. if such additional properties are desired.

It is also contemplated that the films of the present subject matter may be used or incorporated in a wide array of packages, packaging components, and the like. Due to the excellent barrier properties of the films, articles using such films may find application in food packaging or other uses in which sealing is desired to retain certain characteristics of the sealed products, and/or to prevent entry of environmental agents into the sealed region.

According to certain embodiments of the subject matter, each of the layers of a multilayer film may have varying compositions in order to impart suitable properties to the films. For example, in certain embodiments, an exterior layer of the film may include one or more acrylate components to promote bonding with a nonwoven fabric. Similarly, the compositions and blends of an exterior layer of the multilayer films may be formulated to impart desirable bonding strength among the layers such as, for example, using copolymers that favor thermal bonding or RF bonding techniques. As such, the films of the invention have the additional benefit of providing improved sealability among the films when used, for example, in the pouches of the present subject matter.

Methods

The present subject matter also provides various methods. In one aspect, the subject matter provides a method for forming an RF weldable film and/or a polymeric barrier film with excellent properties. The method generally includes providing an RF weldable film and/or a polymeric barrier composition. Examples of such compositions include those previously described herein. The method also includes forming a film from the noted composition(s). Extrusion techniques are preferred, however other known methods can be used for forming films. In many of the embodiments, it is preferred that the composition(s) is free of halogens.

The various layers and films can be extruded, coated, or otherwise formed by techniques known in the art. Co-extrusion techniques can also be utilized. For certain applications in which increased toughness and/or durability are desired, films can be blown.

The present subject matter further provides methods of using the various compositions, films, and multilayer assemblies described herein. For example, a method for reducing transmission of odorous species is provided. The term "odorous species" as used herein refers to molecules or chemical species which are generally perceived by a user as unpleasant. A non-limiting example of odorous species is skatole or 3-methylindole. Another non-limiting example of an odorous species is hydrogen sulfide. The method comprises providing a semi-crystalline cyclic olefin copolymer, preferably as described herein. The method also comprises forming a film which includes the semi-crystalline cyclic olefin copolymer. And, the method also comprises positioning or placing the film between a source of the odorous species and a user. This latter operation typically involves forming the film into a container or pouch, or incorporating the film into such, and then using the container or pouch to hold, store, or collect material containing the odorous species.

The preferred embodiment barrier film constructions are believed to exhibit several advantages over currently known ostomy films. The preferred films are halogen-free and avoid the use of polyvinylidene chloride (PVDC). The preferred films are relatively quiet and exhibit significantly less "rustle". And, the preferred films exhibit superior odor blocking characteristics. Furthermore, the preferred films exhibit a combination of some and preferably all of these features. The film construction may be transparent or contain coloring agents.

The present subject matter also provides various techniques and strategies relating to the use of the films and multilayer assemblies described herein, incorporation and use of the films and multilayer assemblies in articles, and in determining a minimum thickness of an RF weldable layer in a multilayer film. For example, using the compositions described herein, an artisan can now readily assess a minimum thickness of an RF weldable layer as follows. The total concentration of polar groups in the RF-active components in the RF weldable layer is determined. Expressing the total concentration of the polar groups in mole percent, the following equation (I) is used:

$$LT(\%) \geq 465.7 X^{-1.004} \quad (I)$$

in which LT(%) is the thickness of the RF weldable layer expressed as a percentage of the total thickness of the film; and X is the total concentration of polar groups in mole percent of the RF-active components in the RF weldable layer. Application and use of equation (I) is described in the accompanying examples.

EXAMPLES

Example 1

A series of trials were performed in which various multilayer barrier films were prepared. The barrier films contained a layer according to the subject matter described herein which included one or more RF-active functionalized ethylene copolymers and a propylene based plastomer. A total of 17 barrier films were prepared, and designated as samples A-Q. The multilayer barrier films A-Q are set forth below in Tables 2-18, respectively.

TABLE 2

Barrier Film A

| Layer | Layer % | Component | Weight % | Density | cc/g | Weight % |
|---|---|---|---|---|---|---|
| A | 10.00% | 13.5% EVA | 48.50% | 0.933 | | |
| | | 30% BA EBA | 48.50% | 0.930 | | |
| | | Slip/AB | 3.00% | 1.010 | | |
| | | Total | 100.00% | 0.934 | 0.093367469 | 9.88% |
| B | 13.00% | Plastomer | 100.00% | 0.877 | | |
| | | Total | 100.00% | 1.000 | 0.13 | 13.76% |
| C | 12.00% | Plastomer | 100.00% | 0.877 | | |
| | | Total | 100.00% | 0.877 | 0.10524 | 11.14% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| E | 7.00% | 44 mol EVOH | 100.00% | 1.130 | | |
| | | Total | 100.00% | 1.130 | 0.0791 | 8.37% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| G | 12.00% | Plastomer | 100.00% | 0.877 | | |
| | | Total | 100.00% | 0.877 | 0.10524 | 11.14% |

TABLE 2-continued

| | | Barrier Film A | | | | |
|---|---|---|---|---|---|---|
| Layer | Layer % | Component | Weight % | Density | cc/g | Weight % |
| H | 20.00% | 30% BA EBA | 70.00% | 0.930 | | |
| | | Plastomer | 30.00% | 0.877 | | |
| | | Total | 100.00% | 0.913 | 0.182687871 | 19.33% |
| I | 10.00% | 30% BA EBA | 90.00% | 0.930 | | |
| | | Slip/AB | 10.00% | 1.010 | | |
| | | Antimicrobial | 0.00% | 1.068 | | |
| | | Total | 100.00% | 0.937 | 0.093742515 | 9.92% |
| | 100.00% | | | 0.945 | 0.944975854 | 100.00% |

TABLE 3

| | | Barrier Film B | | | | |
|---|---|---|---|---|---|---|
| Layer | Layer % | Component | Weight % | Density | cc/g | Weight % |
| A | 10.00% | 13.5% EVA | 47.50% | 0.933 | | |
| | | 30% BA EBA | 47.50% | 0.930 | | |
| | | Slip/AB | 5.00% | 1.010 | | |
| | | Total | 100.00% | 0.935 | 0.093513175 | 10.04% |
| B | 16.00% | 30% BA EBA | 30.00% | 0.930 | | |
| | | Plastomer | 70.00% | 0.877 | | |
| | | Total | 100.00% | 0.892 | 0.142760748 | 15.32% |
| C | 13.00% | Plastomer | 100.00% | 0.877 | | |
| | | Total | 100.00% | 0.877 | 0.11401 | 12.24% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.35% |
| E | 7.00% | 44 mol EVOH | 100.00% | 1.130 | | |
| | | Total | 100.00% | 1.130 | 0.0791 | 8.49% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.35% |
| G | 8.00% | Plastomer | 100.00% | 0.877 | | |
| | | Total | 100.00% | 0.877 | 0.07016 | 7.53% |
| H | 20.00% | 30% BA EBA | 70.00% | 0.930 | | |
| | | Plastomer | 30.00% | 0.877 | | |
| | | Total | 100.00% | 0.913 | 0.182687871 | 19.61% |
| I | 10.00% | 30% BA EBA | 90.00% | 0.930 | | |
| | | Slip/AB | 10.00% | 1.010 | | |
| | | Antimicrobial | 0.00% | 1.068 | | |
| | | Total | 100.00% | 0.937 | 0.093742515 | 10.06% |
| | 100.00% | | | 0.932 | 0.931572308 | 100.00% |

TABLE 4

| | | Barrier Film C | | | | |
|---|---|---|---|---|---|---|
| Layer | Layer % | Component | Weight % | Density | cc/g | Weight % |
| A | 10.00% | 13.5% EVA | 48.50% | 0.933 | | |
| | | 30% BA EBA | 48.50% | 0.930 | | |
| | | Slip/AB | 3.00% | 1.010 | | |
| | | Total | 100.00% | 0.934 | 0.093367469 | 9.88% |

TABLE 4-continued

Barrier Film C

| Layer | Layer % | Component | Weight % | Density | cc/g | Weight % |
|---|---|---|---|---|---|---|
| B | 13.00% | Plastomer | 100.00% | 0.877 | | |
| | | Total | 100.00% | 1.000 | 0.13 | 13.75% |
| C | 12.00% | Plastomer | 100.00% | 0.877 | | |
| | | Total | 100.00% | 0.877 | 0.10524 | 11.13% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| E | 7.00% | 44 mol EVOH | 100.00% | 1.130 | | |
| | | Total | 100.00% | 1.130 | 0.0791 | 8.37% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| G | 12.00% | Plastomer | 100.00% | 0.877 | | |
| | | Total | 100.00% | 0.877 | 0.10524 | 11.13% |
| H | 20.00% | 30% BA EBA | 70.00% | 0.930 | | |
| | | Plastomer | 30.00% | 0.877 | | |
| | | Total | 100.00% | 0.913 | 0.182687871 | 19.32% |
| I | 10.00% | 30% BA EBA | 85.00% | 0.930 | | |
| | | Slip/AB | 15.00% | 1.010 | | |
| | | Antimicrobial | 0.00% | 1.068 | | |
| | | Total | 100.00% | 0.941 | 0.094118236 | 9.96% |
| | 100.00% | | | 0.945 | 0.945351575 | 100.00% |

TABLE 5

Barrier Film D

| Layer | Layer % | Component | Weight % | Density | cc/g | Weight % |
|---|---|---|---|---|---|---|
| A | 10.00% | 13.5% EVA | 45.00% | 0.933 | | |
| | | 30% BA EBA | 45.00% | 0.930 | | |
| | | Slip/AB | 10.00% | 1.010 | | |
| | | Total | 100.00% | 0.939 | 0.093879438 | 9.93% |
| B | 13.00% | Plastomer | 100.00% | 0.877 | | |
| | | Total | 100.00% | 1.000 | 0.13 | 13.75% |
| C | 12.00% | Plastomer | 100.00% | 0.877 | | |
| | | Total | 100.00% | 0.877 | 0.10524 | 11.13% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| E | 7.00% | 44 mol EVOH | 100.00% | 1.130 | | |
| | | Total | 100.00% | 1.130 | 0.0791 | 8.37% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| G | 12.00% | Plastomer | 100.00% | 0.877 | | |
| | | Total | 100.00% | 0.877 | 0.10524 | 11.13% |
| H | 20.00% | 30% BA EBA | 70.00% | 0.930 | | |
| | | Plastomer | 30.00% | 0.877 | | |
| | | Total | 100.00% | 0.913 | 0.182687871 | 19.33% |

TABLE 5-continued

| | | Barrier Film D | | | | |
|---|---|---|---|---|---|---|
| Layer | Layer % | Component | Weight % | Density | cc/g | Weight % |
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.093518519 | 9.89% |
| | 100.00% | | | 0.945 | 0.945263827 | 100.00% |

TABLE 6

| | | Barrier Film E | | | | |
|---|---|---|---|---|---|---|
| Layer | Layer % | Component | Weight % | Density | cc/g | Weight % |
| A | 10.00% | 13.5% EVA | 48.50% | 0.933 | | |
| | | 30% BA EBA | 48.50% | 0.930 | | |
| | | Slip/AB | 3.00% | 1.010 | | |
| | | Total | 100.00% | 0.934 | 0.093367469 | 9.88% |
| B | 13.00% | Plastomer | 100.00% | 0.877 | | |
| | | Total | 100.00% | 1.000 | 0.13 | 13.76% |
| C | 12.00% | Plastomer | 100.00% | 0.877 | | |
| | | Total | 100.00% | 0.877 | 0.10524 | 11.14% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| E | 7.00% | 44 mol EVOH | 100.00% | 1.130 | | |
| | | Total | 100.00% | 1.130 | 0.0791 | 8.37% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| G | 12.00% | Plastomer | 100.00% | 0.877 | | |
| | | Total | 100.00% | 0.877 | 0.10524 | 11.14% |
| H | 20.00% | 30% BA EBA | 70.00% | 0.930 | | |
| | | Plastomer | 30.00% | 0.877 | | |
| | | Total | 100.00% | 0.913 | 0.182687871 | 19.33% |
| I | 10.00% | 30% BA EBA | 90.00% | 0.930 | | |
| | | Slip/AB | 10.00% | 1.010 | | |
| | | Antimicrobial | 0.00% | 1.068 | | |
| | | Total | 100.00% | 0.937 | 0.093742515 | 9.92% |
| | 100.00% | | | 0.945 | 0.944975854 | 100.00% |

TABLE 7

| | | Barrier Film F | | | | |
|---|---|---|---|---|---|---|
| Layer | Layer % | Component | Weight % | Density | cc/g | Weight % |
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659337 | 9.93% |
| B | 13.00% | Plastomer | 100.00% | 0.877 | | |
| | | Total | 100.00% | 1.000 | 0.13 | 13.78% |
| C | 12.00% | Plastomer | 100.00% | 0.877 | | |
| | | Total | 100.00% | 0.877 | 0.10524 | 11.15% |

TABLE 7-continued

Barrier Film F

| Layer | Layer % | Component | Weight % | Density | cc/g | Weight % |
|---|---|---|---|---|---|---|
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.25% |
| E | 7.00% | 44 mol EVOH | 100.00% | 1.130 | | |
| | | Total | 100.00% | 1.130 | 0.0791 | 8.38% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.25% |
| G | 12.00% | Plastomer | 100.00% | 0.877 | | |
| | | Total | 100.00% | 0.877 | 0.10524 | 11.15% |
| H | 20.00% | 30% BA EBA | 50.00% | 0.930 | | |
| | | Plastomer | 50.00% | 0.877 | | |
| | | Total | 100.00% | 0.903 | 0.180544549 | 19.14% |
| I | 10.00% | 30% BA EBA | 85.00% | 0.930 | | |
| | | Slip/AB | 15.00% | 1.010 | | |
| | | Antimicrobial | 0.00% | 1.068 | | |
| | | Total | 100.00% | 0.941 | 0.094118236 | 9.98% |
| | 100.00% | | | 0.944 | 0.943500121 | 100.00% |

TABLE 8

Barrier Film G

| Layer | Layer % | Component | Weight % | Density | cc/g | Weight % |
|---|---|---|---|---|---|---|
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659337 | 9.93% |
| B | 13.00% | Plastomer | 100.00% | 0.877 | | |
| | | Total | 100.00% | 1.000 | 0.13 | 13.78% |
| C | 12.00% | Plastomer | 100.00% | 0.877 | | |
| | | Total | 100.00% | 0.877 | 0.10524 | 11.16% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.25% |
| E | 7.00% | 44 mol EVOH | 100.00% | 1.130 | | |
| | | Total | 100.00% | 1.130 | 0.0791 | 8.39% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.25% |
| G | 12.00% | Plastomer | 100.00% | 0.877 | | |
| | | Total | 100.00% | 0.877 | 0.10524 | 11.16% |
| H | 20.00% | 30% BA EBA | 50.00% | 0.930 | | |
| | | Plastomer | 50.00% | 0.877 | | |
| | | Total | 100.00% | 0.903 | 0.180544549 | 19.14% |
| I | 10.00% | 30% BA EBA | 90.00% | 0.930 | | |
| | | Slip/AB | 10.00% | 1.010 | | |
| | | Antimicrobial | 0.00% | 1.068 | | |
| | | Total | 100.00% | 0.937 | 0.093742515 | 9.94% |
| | 100.00% | | | 0.943 | 0.9431244 | 100.00% |

TABLE 9

Barrier Film H

| Layer | Layer % | Component | Weight % | Density | cc/g | Weight % |
|---|---|---|---|---|---|---|
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659337 | 9.93% |
| B | 13.00% | Plastomer | 100.00% | 0.877 | | |
| | | Total | 100.00% | 1.000 | 0.13 | 13.79% |
| C | 12.00% | Plastomer | 100.00% | 0.877 | | |
| | | Total | 100.00% | 0.877 | 0.10524 | 11.16% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.25% |
| E | 7.00% | 44 mol EVOH | 100.00% | 1.130 | | |
| | | Total | 100.00% | 1.130 | 0.0791 | 8.39% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.25% |
| G | 12.00% | Plastomer | 100.00% | 0.877 | | |
| | | Total | 100.00% | 0.877 | 0.10524 | 11.16% |
| H | 20.00% | 30% BA EBA | 50.00% | 0.930 | | |
| | | Plastomer | 50.00% | 0.877 | | |
| | | Total | 100.00% | 0.903 | 0.180544549 | 19.15% |
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.093518519 | 9.92% |
| | 100.00% | | | 0.943 | 0.942900403 | 100.00% |

TABLE 10

Barrier Film I

| Layer | Layer % | Component | Weight % | Density | cc/g | Weight % |
|---|---|---|---|---|---|---|
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659337 | 10.08% |
| B | 16.00% | 30% BA EBA | 30.00% | 0.930 | | |
| | | Plastomer | 70.00% | 0.877 | | |
| | | Total | 100.00% | 0.892 | 0.142760748 | 15.36% |
| C | 9.00% | Plastomer | 100.00% | 0.877 | | |
| | | Total | 100.00% | 0.877 | 0.07893 | 8.49% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.37% |
| E | 7.00% | 44 mol EVOH | 100.00% | 1.130 | | |
| | | Total | 100.00% | 1.130 | 0.0791 | 8.51% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.37% |
| G | 12.00% | Plastomer | 100.00% | 0.877 | | |
| | | Total | 100.00% | 0.877 | 0.10524 | 11.32% |

TABLE 10-continued

| | | Barrier Film I | | | | |
|---|---|---|---|---|---|---|
| Layer | Layer % | Component | Weight % | Density | cc/g | Weight % |
| H | 20.00% | 30% BA EBA | 50.00% | 0.930 | | |
| | | Plastomer | 50.00% | 0.877 | | |
| | | Total | 100.00% | 0.903 | 0.180544549 | 19.43% |
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.093518519 | 10.06% |
| | 100.00% | | | 0.929 | 0.929351151 | 100.00% |

TABLE 11

| | | Barrier Film J | | | | |
|---|---|---|---|---|---|---|
| Layer | Layer % | Component | Weight % | Density | cc/g | Weight % |
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659337 | 10.06% |
| B | 16.00% | 30% BA EBA | 50.00% | 0.930 | | |
| | | Plastomer | 50.00% | 0.877 | | |
| | | Total | 100.00% | 0.903 | 0.144435639 | 15.51% |
| C | 9.00% | Plastomer | 100.00% | 0.877 | | |
| | | Total | 100.00% | 0.877 | 0.07893 | 8.48% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.36% |
| E | 7.00% | 44 mol EVOH | 100.00% | 1.130 | | |
| | | Total | 100.00% | 1.130 | 0.0791 | 8.50% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.36% |
| G | 12.00% | Plastomer | 100.00% | 0.877 | | |
| | | Total | 100.00% | 0.877 | 0.10524 | 11.30% |
| H | 20.00% | 30% BA EBA | 50.00% | 0.930 | | |
| | | Plastomer | 50.00% | 0.877 | | |
| | | Total | 100.00% | 0.903 | 0.180544549 | 19.39% |
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.093518519 | 10.04% |
| | 100.00% | | | 0.931 | 0.931026042 | 100.00% |

TABLE 12

| | | Barrier Film K | | | | |
|---|---|---|---|---|---|---|
| Layer | Layer % | Component | Weight % | Density | cc/g | Weight % |
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659337 | 10.07% |

TABLE 12-continued

Barrier Film K

| Layer | Layer % | Component | Weight % | Density | cc/g | Weight % |
|---|---|---|---|---|---|---|
| B | 16.00% | 30% BA EBA | 40.00% | 0.930 | | |
|  |  | Plastomer | 60.00% | 0.877 | | |
|  |  | Total | 100.00% | 0.897 | 0.14359331 | 15.44% |
| C | 9.00% | Plastomer | 100.00% | 0.877 | | |
|  |  | Total | 100.00% | 0.877 | 0.07893 | 8.49% |
| D | 8.00% | COC | 51.00% | 1.020 | | |
|  |  | COC | 29.00% | 0.940 | | |
|  |  | Tie resin | 20.00% | 0.910 | | |
|  |  | Total | 100.00% | 0.972 | 0.077799 | 8.36% |
| E | 7.00% | 44 mol EVOH | 100.00% | 1.130 | | |
|  |  | Total | 100.00% | 1.130 | 0.0791 | 8.50% |
| F | 8.00% | COC | 51.00% | 1.020 | | |
|  |  | COC | 29.00% | 0.940 | | |
|  |  | Tie resin | 20.00% | 0.910 | | |
|  |  | Total | 100.00% | 0.972 | 0.077799 | 8.36% |
| G | 12.00% | Plastomer | 100.00% | 0.877 | | |
|  |  | Total | 100.00% | 0.877 | 0.10524 | 11.31% |
| H | 20.00% | 30% BA EBA | 50.00% | 0.930 | | |
|  |  | Plastomer | 50.00% | 0.877 | | |
|  |  | Total | 100.00% | 0.903 | 0.180544549 | 19.41% |
| I | 10.00% | 30% BA EBA | 93.00% | 0.930 | | |
|  |  | Slip/AB | 7.00% | 1.010 | | |
|  |  | Antimicrobial | 0.00% | 1.068 | | |
|  |  | Total | 100.00% | 0.935 | 0.093518519 | 10.05% |
|  | 100.00% |  |  | 0.930 | 0.930183713 | 100.00% |

TABLE 13

Barrier Film L

| Layer | Layer % | Component | Weight % | Density | cc/g | Weight % |
|---|---|---|---|---|---|---|
| A | 10.00% | 13.5% EVA | 47.50% | 0.933 | | |
|  |  | 30% BA EBA | 47.50% | 0.930 | | |
|  |  | Slip/AB | 5.00% | 1.010 | | |
|  |  | Total | 100.00% | 0.935 | 0.093513175 | 10.05% |
| B | 16.00% | 30% BA EBA | 40.00% | 0.930 | | |
|  |  | Plastomer | 60.00% | 0.877 | | |
|  |  | Total | 100.00% | 0.897 | 0.14359331 | 15.44% |
| C | 9.00% | Plastomer | 100.00% | 0.877 | | |
|  |  | Total | 100.00% | 0.877 | 0.07893 | 8.49% |
| D | 8.00% | COC | 51.00% | 1.020 | | |
|  |  | COC | 29.00% | 0.940 | | |
|  |  | Tie resin | 20.00% | 0.910 | | |
|  |  | Total | 100.00% | 0.972 | 0.077799 | 8.37% |
| E | 7.00% | 44 mol EVOH | 100.00% | 1.130 | | |
|  |  | Total | 100.00% | 1.130 | 0.0791 | 8.51% |
| F | 8.00% | COC | 51.00% | 1.020 | | |
|  |  | COC | 29.00% | 0.940 | | |
|  |  | Tie resin | 20.00% | 0.910 | | |
|  |  | Total | 100.00% | 0.972 | 0.077799 | 8.37% |
| G | 12.00% | Plastomer | 100.00% | 0.877 | | |
|  |  | Total | 100.00% | 0.877 | 0.10524 | 11.32% |
| H | 20.00% | 30% BA EBA | 50.00% | 0.930 | | |
|  |  | Plastomer | 50.00% | 0.877 | | |
|  |  | Total | 100.00% | 0.903 | 0.180544549 | 19.41% |

TABLE 13-continued

Barrier Film L

| Layer | Layer % | Component | Weight % | Density | cc/g | Weight % |
|---|---|---|---|---|---|---|
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.093518519 | 10.06% |
| | 100.00% | | | 0.930 | 0.930037551 | 100.00% |

TABLE 14

Barrier Film M

| Layer | Layer % | Component | Weight % | Density | cc/g | Weight % |
|---|---|---|---|---|---|---|
| A | 10.00% | 13.5% EVA | 47.50% | 0.933 | | |
| | | 30% BA EBA | 47.50% | 0.930 | | |
| | | Slip/AB | 5.00% | 1.010 | | |
| | | Total | 100.00% | 0.935 | 0.093513175 | 10.05% |
| B | 16.00% | 30% BA EBA | 40.00% | 0.930 | | |
| | | Plastomer | 60.00% | 0.877 | | |
| | | Total | 100.00% | 0.897 | 0.14359331 | 15.44% |
| C | 9.00% | Plastomer | 100.00% | 0.877 | | |
| | | Total | 100.00% | 0.877 | 0.07893 | 8.49% |
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.37% |
| E | 7.00% | 44 mol EVOH | 100.00% | 1.130 | | |
| | | Total | 100.00% | 1.130 | 0.0791 | 8.51% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.37% |
| G | 12.00% | Plastomer | 100.00% | 0.877 | | |
| | | Total | 100.00% | 0.877 | 0.10524 | 11.32% |
| H | 20.00% | 30% BA EBA | 50.00% | 0.930 | | |
| | | Plastomer | 50.00% | 0.877 | | |
| | | Total | 100.00% | 0.903 | 0.180544549 | 19.41% |
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.093518519 | 10.06% |
| | 100.00% | | | 0.930 | 0.930037551 | 100.00% |

TABLE 15

Barrier Film N

| Layer | Layer % | Component | Weight % | Density | cc/g | Weight % |
|---|---|---|---|---|---|---|
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659 | 10.04% |
| B | 16.00% | 30% BA EBA | 40.00% | 0.930 | | |
| | | Plastomer | 60.00% | 0.877 | | |
| | | Total | 100.00% | 0.897 | 0.143593 | 15.39% |

TABLE 15-continued

Barrier Film N

| Layer | Layer % | Component | Weight % | Density | cc/g | Weight % |
|---|---|---|---|---|---|---|
| C |  | Plastomer | 100.00% | 0.877 |  |  |
|  | 9.00% |  |  |  |  |  |
|  |  | Total | 100.00% | 0.877 | 0.07893 | 8.46% |
| D | 8.00% | COC | 72.00% | 1.020 |  |  |
|  |  | COC | 8.00% | 0.940 |  |  |
|  |  | Tie resin | 20.00% | 0.910 |  |  |
|  |  | Total | 100.00% | 0.989 | 0.079148 | 8.48% |
| E | 7.00% | 44 mol EVOH | 100.00% | 1.130 |  |  |
|  |  | Total | 100.00% | 1.130 | 0.0791 | 8.48% |
| F | 8.00% | COC | 72.00% | 1.020 |  |  |
|  |  | COC | 8.00% | 0.940 |  |  |
|  |  | Tie resin | 20.00% | 0.910 |  |  |
|  |  | Total | 100.00% | 0.989 | 0.079148 | 8.48% |
| G | 12.00% | Plastomer | 100.00% | 0.877 |  |  |
|  |  | Total | 100.00% | 0.877 | 0.10524 | 11.28% |
| H | 20.00% | 30% BA EBA | 50.00% | 0.930 |  |  |
|  |  | Plastomer | 50.00% | 0.877 |  |  |
|  |  | Total | 100.00% | 0.903 | 0.180545 | 19.35% |
| I | 10.00% | 30% BA EBA | 93.00% | 0.930 |  |  |
|  |  | Slip/AB | 7.00% | 1.010 |  |  |
|  |  | Antimicrobial | 0.00% | 1.068 |  |  |
|  |  | Total | 100.00% | 0.935 | 0.093519 | 10.02% |
|  | 100.00% |  |  | 0.933 | 0.932881 | 100.00% |

TABLE 16

Barrier Film O

| Layer | Layer % | Component | Weight % | Density | cc/g | Weight % |
|---|---|---|---|---|---|---|
| A | 10.00% | 13.5% EVA | 46.50% | 0.933 |  |  |
|  |  | 30% BA EBA | 46.50% | 0.930 |  |  |
|  |  | Slip/AB | 7.00% | 1.010 |  |  |
|  |  | Total | 100.00% | 0.937 | 0.093659337 | 10.14% |
| B | 16.00% | 30% BA EBA | 40.00% | 0.930 |  |  |
|  |  | Plastomer | 60.00% | 0.877 |  |  |
|  |  | Total | 100.00% | 0.897 | 0.14359331 | 15.54% |
| C | 9.00% | Plastomer | 100.00% | 0.877 |  |  |
|  |  | Total | 100.00% | 0.877 | 0.07893 | 8.54% |
| D | 8.00% | COC | 60.00% | 1.020 |  |  |
|  |  | Plastomer | 20.00% | 0.867 |  |  |
|  |  | Tie resin | 20.00% | 0.910 |  |  |
|  |  | Total | 100.00% | 0.963 | 0.077019646 | 8.33% |
| E | 7.00% | 44 mol EVOH | 80.00% | 1.130 |  |  |
|  |  | Plastomer | 20.00% | 0.867 |  |  |
|  |  | Total | 80.00% | 1.065 | 0.074575576 | 8.07% |
| F | 8.00% | COC | 60.00% | 1.020 |  |  |
|  |  | Plastomer | 20.00% | 0.867 |  |  |
|  |  | Tie resin | 20.00% | 0.910 |  |  |
|  |  | Total | 100.00% | 0.963 | 0.077019646 | 8.33% |
| G | 12.00% | Plastomer | 100.00% | 0.877 |  |  |
|  |  | Total | 100.00% | 0.877 | 0.10524 | 11.39% |
| H | 20.00% | 30% BA EBA | 50.00% | 0.930 |  |  |
|  |  | Plastomer | 50.00% | 0.877 |  |  |
|  |  | Total | 100.00% | 0.903 | 0.180544549 | 19.54% |

TABLE 16-continued

Barrier Film O

| Layer | Layer % | Component | Weight % | Density | cc/g | Weight % |
|---|---|---|---|---|---|---|
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.093518519 | 10.12% |
| | | | | 0.924 | 0.924100583 | 100.00% |

TABLE 17

Barrier Film P

| Layer | Layer % | Component | Weight % | Density | cc/g | Weight % |
|---|---|---|---|---|---|---|
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.0936593 | 10.09% |
| B | 16.00% | 30% BA EBA | 40.00% | 0.930 | | |
| | | Plastomer | 60.00% | 0.877 | | |
| | | Total | 100.00% | 0.897 | 0.1435933 | 15.48% |
| C | 9.00% | Plastomer | 100.00% | 0.877 | | |
| | | Total | 100.00% | 0.877 | 0.07893 | 8.51% |
| D | 8.00% | COC | 74.00% | 1.020 | | |
| | | Plastomer | 6.00% | 0.870 | | |
| | | Tie resin | 20.00% | 0.910 | | |
| | | Total | 100.00% | 0.986 | 0.0788771 | 8.50% |
| E | 7.00% | 44 mol EVOH | 80.00% | 1.130 | | |
| | | Plastomer | 20.00% | 0.870 | | |
| | | Total | 80.00% | 1.066 | 0.0746388 | 8.04% |
| F | 8.00% | COC | 74.00% | 1.020 | | |
| | | Plastomer | 6.00% | 0.870 | | |
| | | Tie resin | 20.00% | 0.910 | | |
| | | Total | 100.00% | 0.986 | 0.0788771 | 8.50% |
| G | 12.00% | Plastomer | 100.00% | 0.877 | | |
| | | Total | 100.00% | 0.877 | 0.10524 | 11.34% |
| H | 20.00% | 30% BA EBA | 50.00% | 0.930 | | |
| | | Plastomer | 50.00% | 0.877 | | |
| | | Total | 100.00% | 0.903 | 0.1805445 | 19.46% |
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.0935185 | 10.08% |
| | 100.00% | | | 0.928 | 0.9278788 | 100.00% |

TABLE 18

Barrier Film Q

| Layer | Layer % | Component | Weight % | Density | cc/g | Weight % |
|---|---|---|---|---|---|---|
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659337 | 9.90% |
| B | 13.00% | Plastomer | 100.00% | 0.877 | | |
| | | Total | 100.00% | 1.000 | 0.13 | 13.75% |
| C | 12.00% | Plastomer | 100.00% | 0.877 | | |
| | | Total | 100.00% | 0.877 | 0.10524 | 11.13% |

TABLE 18-continued

Barrier Film Q

| Layer | Layer % | Component | Weight % | Density | cc/g | Weight % |
|---|---|---|---|---|---|---|
| D | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| E | 7.00% | 44 mol EVOH | 100.00% | 1.130 | | |
| | | Total | 100.00% | 1.130 | 0.0791 | 8.36% |
| F | 8.00% | COC | 51.00% | 1.020 | | |
| | | COC | 29.00% | 0.940 | | |
| | | Tie resin | 20.00% | 0.910 | | |
| | | Total | 100.00% | 0.972 | 0.077799 | 8.23% |
| G | 12.00% | Plastomer | 100.00% | 0.877 | | |
| | | Total | 100.00% | 0.877 | 0.10524 | 11.13% |
| H | 20.00% | 30% BA EBA | 70.00% | 0.930 | | |
| | | Plastomer | 30.00% | 0.877 | | |
| | | Total | 100.00% | 0.913 | 0.182687871 | 19.32% |
| I | 10.00% | 30% BA EBA | 85.00% | 0.930 | | |
| | | Slip/AB | 15.00% | 1.010 | | |
| | | Antimicrobial | 0.00% | 1.068 | | |
| | | Total | 100.00% | 0.941 | 0.094118236 | 9.95% |
| | 100.00% | | | 0.946 | 0.945643443 | 100.00% |

Figure 4:
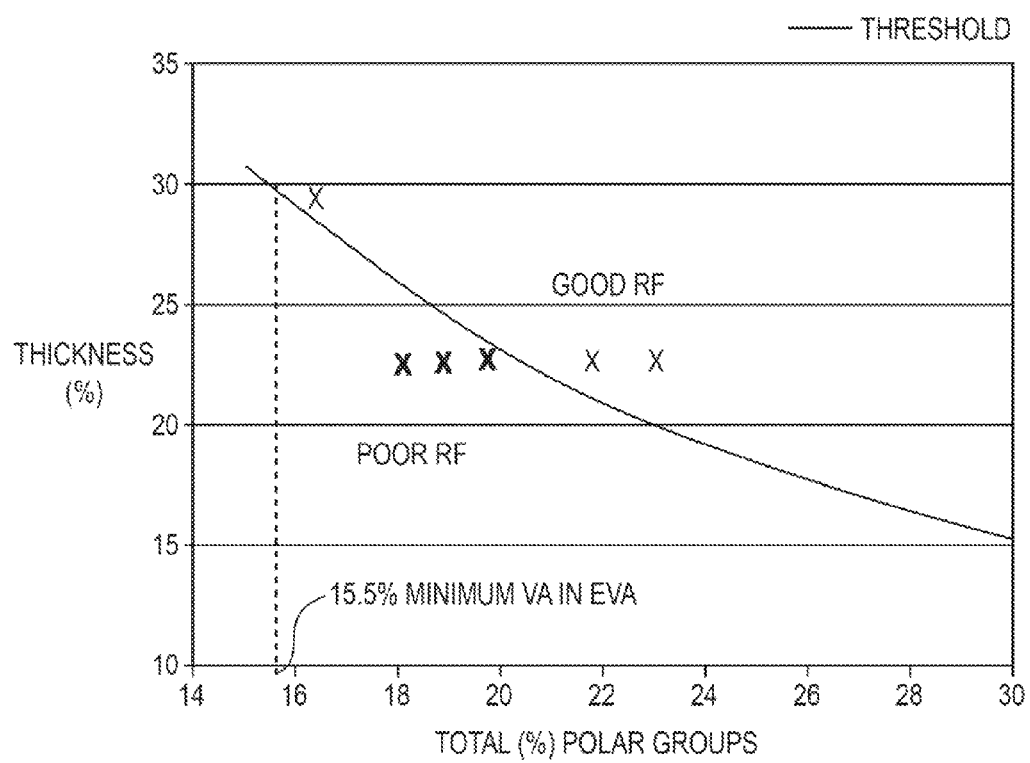
FIG. 4 is a graph illustrating a threshold curve for obtaining desirable RF weldability characteristics associated with a layer according to the present subject matter.

In order to assess the RF weldability properties of the various barrier films, RF-active layers having various total concentrations of RF-active components such as ethylene vinyl acetate (EVA) and ethylene butyl acrylate (EBA) and various thicknesses were incorporated in the barrier films. Generally, as the total concentration of the RF-active components was increased, the thickness of the layer could be decreased. RF weldability was found to be acceptable for certain combinations of layer thicknesses and total concentration of RF-active components in the layer. FIG. 4 graphically illustrates a threshold curve separating regions of poor RF weldability from regions of good RF weldability. Specifically, combinations of layer thickness and total concentration of RF-active components under or to the left of the threshold curve can be expected to exhibit poor RF weldability properties. And, combinations of layer thickness and total concentration of RF-active components above or to the right of the threshold curve can be expected to exhibit good RF weldability properties.

Table 19 set forth below summarizes measurements of weld strength for various welded samples as butyl acrylate (BA) content varied in a blend of an RF weldable polymer and a polypropylene copolymer. The weld strength was measured by a T-peel strength test as described in ASTM D-1876, of the welded sample. Specifically, referring to Table 19, samples A-D were prepared in which each sample included an outer skin layer A of a multilayer assembly. The skin layer A comprised ethylene butyl acrylate (EBA). Each sample included a sublayer B adjacent to the skin layer A. The sublayer B comprised varying proportions of a polypropylene plastomer and EBA. The total BA content of the two layers is noted in Table 19. After RF welding, the samples were subjected to T-peel testing to assess the weld strength. As indicated by Table 19, as the total BA content of layers A and B increased, the weld strength increased. It is surprising that these assemblies exhibit such relatively high weld strengths. Generally, for a two layered assembly, e.g. an outer layer of an RF active agent and an inner layer immediately adjacent the outer layer in which the inner layer includes a blend of an RF-active functionalized ethylene copolymer such as EBA and a propylene based plastomer, after RF welding, samples B-D exhibited a T-peel bond strength of at least about 16 N/in.

TABLE 19

Weld Strength

| Sample | Thickness, % Layer A (%) | Thickness, % Layer B (%) | Skin Layer A EBA (%) | Sub-layer B EBA (%) | Sub-layer B PP copolymer (%) | Total BA Content (%) | 1 sec Weld Strength T-Peel N/in |
|---|---|---|---|---|---|---|---|
| A | 10 | 13 | 100 | 0 | 100 | 13.0 | 11.59 |
| B | 10 | 16 | 100 | 30 | 70 | 17.1 | 16.4 |
| C | 10 | 16 | 100 | 40 | 60 | 18.9 | 16.8 |
| D | 10 | 16 | 100 | 50 | 50 | 20.8 | 19 |

A layer thickness which will provide for good RF weldability characteristics can be determined by the previously noted equation (I):

$$LT(\%) \geq 465.7 X^{-1.004} \quad (I)$$

in which LT(%) is the thickness of the RF weldable layer expressed as a percentage of the total thickness of the film; and X is the total concentration of polar groups in mole percent of the RF-active components in the RF weldable layer. Using Equation (I), thus if an RF weldable layer is to contain RF-active components at amounts so as to provide a total molar percentage of polar groups of 30%, a layer thickness of 15.3% or greater (the layer thickness expressed as a percentage of the total thickness of the film) will provide good RF weldability characteristics. Similarly, using Equation (I), if an RF weldable layer is to contain RF-active components at amounts to provide a total molar percentage of polar groups of 22%, then a layer thickness of at least 20.9% will provide good RF weldability characteristics. RF welding of these layers was performed using a Thermotron RF welder equipped with a 10 KW power supply. RF welding conditions used for making welded test specimens were: Pre-seal time: 0.41 seconds, Seal time: 1 second, Cool time: 0.25 seconds, Tool temperature: 150° F., and plate and grid current setting: 14.

It will be readily appreciated that Equation (I) can also be used to determine a minimum amount of polar groups and hence amount(s) of RF-active components in an RF weldable layer based upon a particular thickness for the RF weldable layer.

Many other benefits will no doubt become apparent from future application and development of this technology.

All patents, published applications, and articles noted herein are hereby incorporated by reference in their entirety.

As described hereinabove, the present subject matter overcomes many problems associated with previous strategies, systems and/or articles. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A welded film assembly comprising:
   an outer skin layer including at least one RF-active agent;
   wherein the RF active agent is a functionalized ethylene copolymer;
   a second layer immediately adjacent to the skin layer, the second layer including a blend of at least one RF-active functionalized ethylene copolymer and at least one propylene based plastomer; and
   wherein the functionalized ethylene copolymer of each layer is selected from the group consisting ethylene vinyl acetate (EVA), ethyl methyl acrylate (EMA); ethyl butyl acrylate (EBA), and combinations thereof.

2. The welded film assembly of claim 1 wherein the outer skin layer and the second layer are welded together and exhibit a T-peel bond strength of at least about 16 N/in.

3. The welded film assembly of claim 1 wherein the second layer includes from about 30% to about 95% of RF-active functionalized ethylene copolymer.

4. The welded film assembly of claim 2 wherein the second layer includes from about 30% to about 95% of RF-active functionalized ethylene copolymer.

5. The welded film assembly of claim 1 wherein the functionalized ethylene copolymer is ethylene vinyl acetate (EVA).

6. A film comprising at least one layer including:
   from about 30% to about 95% of at least one RF-active functionalized ethylene copolymer; and
   at least one propylene based plastomer
   wherein the at least one layer including the at least one RF-active functionalized ethylene copolymer is an RF weldable layer, the film further including:
   at least one barrier layer comprising at least one cyclic olefin copolymer (COC).

7. The film of claim 6 wherein the functionalized ethylene copolymer is selected from the group consisting of ethylene vinyl acetate (EVA), ethyl methyl acrylate (EMA), ethyl butyl acrylate (EBA), and combinations thereof.

8. The film of claim 6 wherein the propylene based plastomer has a molecular weight distribution of less than 3.5.

9. The film of claim 6 wherein the propylene based plastomer has a density of less than about 0.89 g/cc.

10. The film of claim 6 wherein the propylene based plastomer has a heat of fusion less than 90 J/gm.

11. The film of claim 10 wherein the propylene based plastomer has a heat of fusion less than 70 J/gm.

12. The film of claim 6, wherein the at least one barrier layer includes:
   a first barrier layer comprising at least one cyclic olefin copolymer (COC);
   a second barrier layer comprising ethylene vinyl alcohol (EVOH); and
   a third barrier layer comprising at least one cyclic olefin copolymer (COC).

13. The film of claim 12 wherein the second barrier layer is disposed between the first barrier layer and the third barrier layer.

14. The film of claim 12 wherein at least one of the first barrier layer, the second barrier layer, and the third barrier layer comprises a plastomer different than the propylene based plastomer.

15. An article including a film comprising at least one layer having from about 30% to about 95% of at least one RF-active functionalized ethylene copolymer, and at least one propylene based plastomer;
   wherein the film includes at least one barrier layer comprising at least one barrier agent selected from the group consisting of (i) cyclic olefin copolymer (COC).

16. The article of claim 15 wherein the functionalized ethylene copolymer is selected from the group consisting of ethylene vinyl acetate (EVA), ethyl methyl acrylate (EMA), ethyl butyl acrylate (EBA), and combinations thereof.

17. The article of claim 15 wherein the at least one barrier layer includes (i) a first barrier layer comprising at least one cyclic olefin copolymer (COC), (ii) a second barrier layer comprising ethylene vinyl alcohol (EVOH), and (iii) a third barrier layer comprising at least one cyclic olefin copolymer (COC).

18. The article of claim 17 wherein the second barrier layer is disposed between the first barrier layer and the third barrier layer.

19. The article of claim 17 wherein at least one of the first barrier layer, the second barrier layer, and the third barrier layer comprises a plastomer different than the propylene based plastomer.

20. The article of claim 15 wherein the propylene based plastomer has a molecular weight distribution of less than 3.5.

21. The article of claim 15 wherein the propylene based plastomer has a density of less than about 0.89 g/cc.

22. The article of claim 15 wherein the propylene based plastomer has a heat of fusion less than 90 J/gm.

23. The article of claim 22 wherein the propylene based plastomer has a heat of fusion less than 70 J/gm.

* * * * *